June 7, 1932. B. S. DAGUE 1,861,684
METHOD AND APPARATUS FOR TESTING HOLLOW ARTICLES
Filed Nov. 29, 1927

BYRON S. DAGUE
INVENTOR.

BY Harold Dodd
ATTORNEYS.

UNITED STATES PATENT OFFICE

BYRON S. DAGUE, OF ANNAPOLIS, MARYLAND

METHOD AND APPARATUS FOR TESTING HOLLOW ARTICLES

Application filed November 29, 1927. Serial No. 236,489.

(GRANTED UNDER THE ACT OF MARCH 3, 1883, AS AMENDED APRIL 30, 1928; 370 O. G. 757)

My invention relates broadly to methods and apparatus for testing all hollow articles for flaws and weakened portions and more particularly to methods and apparatus for testing pipes of steam condensers, steam boilers and other heat transfer equipment.

The object of my invention is to detect any flaws produced in the apparatus above designated that have been produced by corrosion or the deleterious effects produced by continued heating. Whereby when the device when out of commission may be tested by such degree of pressure as will indicate its unsafe parts as well as develop and anticipate such part failures as will normally develop between then and the next normal period for overhaul of said device so that regular periodic overhauls may be normally adhered to and yet safe operation of the device may be enjoyed most efficiently.

Great care must be employed in testing tubes and other hollow articles, to be used under pressure before their installation, or at times thereafter, in order to insure against their failure in operation as well as against irregular periods of overhaul and part replacement, as even a small leakage will cause inefficient operation and may result in substantial liability.

While my method may be practiced by any of many different kinds of apparatus, I have devised a particular form of apparatus which has been employed to practice my invention most advantageously and efficiently.

Further object of my invention will appear more fully hereinafter as the description of the method and apparatus is developed.

My invention consists substantially in the method, and in the construction, combination and arrangement of parts associated therewith or as will be more fully hereinafter set forth as shown by the accompanying drawing and finally pointed out in the appended claims.

Reference is to be had to the accompanying drawing forming a part of this specification in which like reference characters indicate corresponding parts throughout the several views and in which:—

Figure 1:
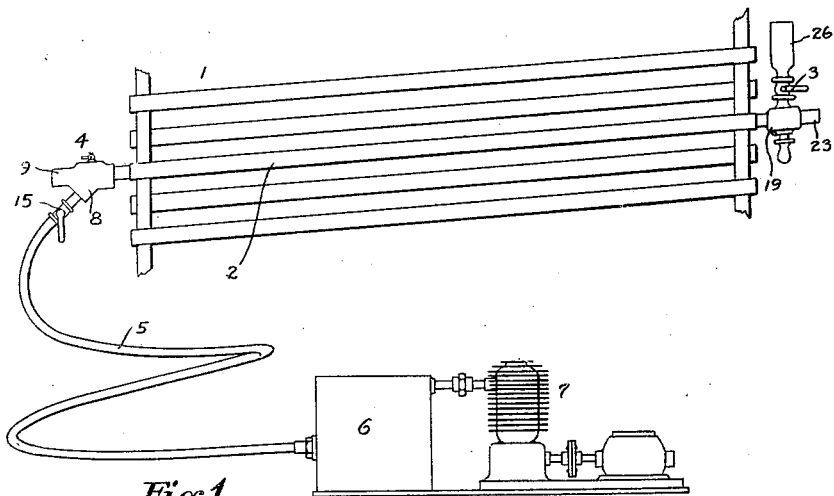
Figure 1 shows the apparatus embodying my invention and attached in operative position to one tube of a steam condenser.

Referring particularly to Figure 1 numeral 1 represents a steam condenser, the tube 2 of which is to be subjected to test. One end of the tube 2 is closed by means of a closure member 3 which is shown in detail in Figure 3. The other end of the tube 2 is closed by means of a closure member 4, shown in detail in Figure 2, to which is attached a flexible conduit 5 that leads to the storage chamber 6 of an air compressor 7. The air compressor may be of any type or when the apparatus is to be used upon a naval vessel the conduit 5 may be connected through suitable reductive valves to the source of compressed air ordinarily utilized for the operation of the torpedos.

Figure 2:
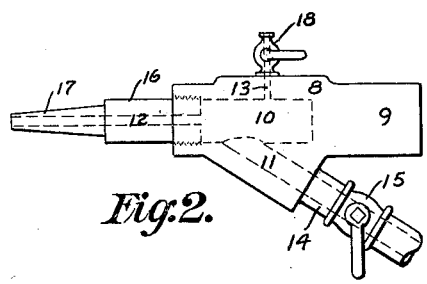
Figure 2 is a detail view of the air entrance closure.

Referring particularly to Figure 2 the closure member consists of a body portion 8 which may be of the shape shown. Upon one end of the body portion is an impact head 9 of tempered metal capable of withstanding the shocks of a hammer. Within the body portion is a chamber 10 out of which lead three passages 11, 12 and 13. Into the end of the passage 11 is secured a pipe fitting 14 which terminates in a quick opening valve 15. The terminal of the valve is adapted to receive the end of the flexible conduit 5 described with reference to Figure 1. The passage 12 is formed through a member consisting of a cylindrical portion 16 having one end threaded into the mouth of chamber 10 and upon whose opposite end is a conical portion 17. The conical portion 17 is of such size that when said portion 17 is inserted within the end of a pipe and secured therein by hammering upon the head 9 it will wedge within the end of the pipe and produce a fluid tight seal therewith. Another outlet from said chamber 10 is closed with a drain cock 18.

Figure 3:
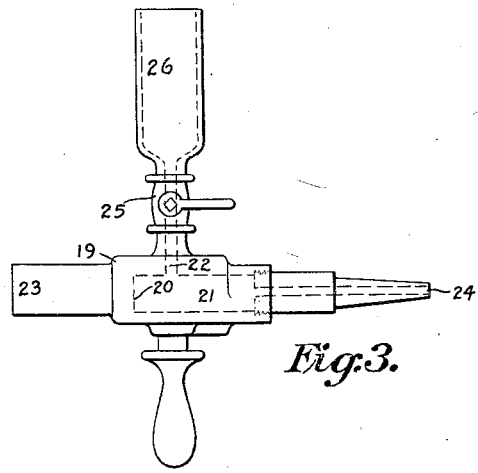
Figure 3 is a detail view of the fluid entrance closure.

The closure member 3, shown in Figure 3, consists of a body member 19 having a chamber 20, two passages 21 and 22, and an impact head 23 of metal tempered similarly to that of the impact head 9. Within the mouth of chamber 20 is secured a nozzle 24 of a shape similar to that of portions 16 and 17 described with reference to Figure 2, and through which nozzle 24 is formed said passage 21. Secured to the body portion 19 and in communication with the passage 22 is a valve 25. This valve carries a vessel 26 that may be shaped similarly to a thistle tube and serves a similar purpose. For ease in manipulation in removing the closure members I have provided a handle that is rigidly secured to the body portion 19, the projection 11 and valve 15 also serving the office of a handle for closure member 8.

In many experiments with testing condenser tubes by means of my fluid hammer test I have found when the tube is approximately in the horizontal position in which most steam condensers are mounted within a ship, that if when the equipment is mounted in the manner shown in Figure 1, and the vessel 26 is filled with a fluid to a sufficient volume, that when the fluid is permitted to flow into the tube 2 it will fill the same to approximately 70% of its total volume, whereupon valve 25 is closed. Then, by momentarily opening valve 15 a pressure of approximately 300 pounds of air, or any other desired pressure, may be instantaneously released through the valve 15, whereupon the resulting pressure of the fluid hammer produced thereby within the tube will be approximately 1100 pounds per square inch, in instances where said pressure of about 300 pounds was employed.

I have further found that, as the angle of inclination of the tubes, in their usual normal mounting in which the same must be tested, varies and the initial air pressure remains constant, the amount of fluid that is introduced into the tube under test from the vessel 26 must vary in proportion to the inclination of the tube from the horizontal for maximum ratio of fluid hammer pressure to air pressure. In the fluid hammer tests upon the tubes of a Yarrow boiler which normally rest at an angle of 48 degrees from the horizontal the amount of fluid necessary to obtain the maximum shock is approximately 95% of the total capacity of the tube.

Assuming a test to be made upon a condenser tube that is in an approximately horizontal position, the method of test is as follows. The closure members 3 and 4 are inserted within the end of the tube and secured therein by a blow with a hammer upon their respective impact heads 23 and 9. The thistle tube 26 is then filled to such a volume that when the valve 25 is opened the fluid will fill substantially 70% of the total volume of the tube. After the fluid is introduced into the tube the valve 25 is again closed. The operator then quickly opens and closes the valve 15 allowing in the interval the air pressure of approximately 300 pounds per square inch from the compressor 7 to start in motion the fluid within the tube.

The fluid hammer thus produced will cause an internal pressure shock of approximately 1100 pounds per square inch to be developed within the tube at the end closed by closure member 3 and substantially throughout the internal volume occupied by said hammering water. Thereupon a reaction of said hammering water will cause it to surge and impact within the opposite end of said tube with high pressure substantially throughout the internal area occupied by said hammering water. Subsequent surges of said hammering water will occur within said tube, each of slightly lesser impact force, until said water comes to rest or is earlier drained off by the removal of said closure members 3 and 4 accomplishable with a hammer or otherwise. This instantaneous pressure is not sufficient to blow out the closure members 3 and 4 but it is sufficient to rupture a faulty tube leaving good tubes unharmed.

It is obvious that steam may be used instead of compressed air to produce the impact of said fluid hammer, and that the same may be produced in any desirable manner.

It will be understood that the above description and accompanying drawing comprehends only the general and preferred embodiment of my invention and that minor detail changes in the construction and arrangements of parts may be made within the scope of the appended claims without sacrificing any of the advantages of my invention.

The invention described herein may be manufactured and used by or for the Government of the United States of America for governmental purposes without the payment of any royalties thereon.

Having thus described my invention what I claim is:

1. In the method of testing hollow articles the steps of placing an impact medium in such article in an amount proportionate to, but less than, the volume of the cavity in said article; sealing said article; and subjecting said medium to an impact.

2. In the method of testing hollow articles the steps of placing an impact medium in such article in an amount proportionate to the volume and angle of inclination of said article, but less than the volume of the cavity in said article; sealing the said article; and subjecting said medium to an impact.

3. In the method of testing hollow articles the steps of placing an impact medium in but not filling the cavity of said article, and causing a flow and stoppage of a power medium to said cavity of the required degree to produce the desired impact force of said medium.

4. In the method of testing hollow articles the steps of placing an impact medium in but not filling the cavity of said article, and causing a plurality of alternate flows and stoppages of a power medium to said cavity each of the required degree to produce the desired impact force of said medium.

5. The method of testing hollow articles which consists in introducing a liquid within the article to form a column therein partially filling the same, momentarily impinging a fluid upon an extremity of the column to impart a high velocity to the same so as to cause the liquid to produce a pounding effect upon the internal structure of the article.

6. The method of testing hollow articles which consists in introducing an impact medium within but not filling the article, imparting a high velocity to said medium and permitting said medium to impinge upon the internal structure of the article.

7. The method of testing hollow articles which consists in introducing a liquid within but not filling the article, momentarily impinging a fluid upon the liquid to impart velocity to the said liquid and permitting the liquid to impinge upon the internal structure of the article.

8. An apparatus for testing hollow articles comprising a fluid system of which the cavity of said hollow article is a part, means for admitting a limited amount of impact medium to the cavity of said article, and means whereby pressure may be admitted to said cavity and impart momentum to said medium.

9. An apparatus for testing hollow articles comprising a fluid system of which the cavity of said hollow article is a part, means for introducing a liquid into and to occupy only a part of said cavity, and means for imparting momentum to the liquid in said cavity.

10. An apparatus for testing hollow articles comprising means for admitting an impact medium to occupy a part of the volume of the article to be tested, means adapted to contain a fluid under pressure, and means for at will admitting fluid of said second named means within said article and imparting velocity to said impact medium therein.

11. In an apparatus for testing hollow articles the combination of a plurality of closure members for the ends of the article under test, means for supplying an impact medium in the cavity of said article, means for applying compressed fluid, a valve attached to one of the closure members and controlling an opening leading through said last named member and into the cavity in said article, and means for conducting the compressed fluid from said fluid supply means to one side of the valve.

12. In an apparatus for testing hollow articles, the combination of a plurality of closure members for the ends of the article under test, each of said closure members consisting of a body portion, an impact head upon the body portion, a conical member rigidly attached to the body portion and adapted to be driven into the end of the article under test, a conduit through the conical member and the body portion, and a valve adjacent the body portion and closing the conduit; a source of compressed fluid and means for conducting the fluid to one side of the valve in one of said closure members and a thistle tube member connected to the valve in the other of said closure members.

13. In an apparatus for testing hollow articles, the combination of a tapering plug adapted to close an opening extending into the cavity of said article by impingement of the taper of said plug in said opening, a hammer head provided upon the outer end of said plug, said plug being provided with an opening extending through said plug and toward said head, and a plurality of valve controlled openings communicating with said opening through said plug and having an outlet beyond the usable portion of said taper of said plug.

14. In an apparatus for testing hollow articles, the combination of a taper plug adapted to close an opening extending into the cavity of said article and provided with an opening extending through said plug and having one of its mouths in the end of said plug bearing the small diameter of said taper, a body member provided with a hammer head and an opening, means whereby said plug may be removably secured in said opening in said body with the opening through said plug communicating with said opening in said body portion, and said body portion having a valve controlled opening communicating with said openings.

15. In an apparatus for testing hollow articles, the combination of a taper plug adapted to close an opening extending into the cavity of said article and provided with an opening extending through said plug and having one of its mouths in the end of said plug bearing the small diameter of said taper, a body member provided with a hammer head and an opening, means whereby said plug may be removably secured in said opening in said body portion with the opening through said plug communicating with said openings in said body portion, and said body portion having a plurality of valve controlled openings communicating with said openings, one of said valve controlled openings being on the top of said body member.

16. In an apparatus for testing hollow articles having a plurality of openings leading into the cavity thereof, the combination of a tapering plug for and adapted to fit into each of said openings and each of said plugs being provided with an opening extending from the small diameter of and through said plug, a body member for each of said plugs and provided with an opening therein communicating with the opening in its associated plug, a valve controlled opening for each of said body members and communicating with the opening therein, and a separate valve controlled opening for one of said members adapted to vent the cavity in said article.

17. In an apparatus for testing hollow articles having a plurality of openings leading into the cavity thereof, the combination of a tapering plug for and adapted to fit into each of said openings and each of said plugs being provided with an opening extending from the small diameter of and through said plug, a body member for each of said plugs and provided with an opening therein communicating with the opening in its associated plug, means for rearwardly securing each of said plugs to their respective body members, a valve controlled opening for each of said body members and communicating with the opening therein, and a separate valve controlled opening for one of said members adapted to vent the cavity in said article.

18. In an apparatus for testing hollow articles having a plurality of openings leading into the cavity thereof, the combination of a tapering plug for and adapted to fit into each of said openings and each of said plugs being provided with an opening extending from the small diameter of and through said plug, a body member for each of said plugs and provided with an opening therein communicating with the opening in its associated plug, a valve controlled opening for each of said body members and communicating with the opening therein, means for connecting one of said valve controlled openings to a source of impact medium supply and the other of said openings, and a separate valve controlled opening for one of said members adapted to vent the cavity in said article.

19. In an apparatus for testing hollow articles adapted to having an opening of small diameter leading into the cavity of such article, means for sealing said opening, means whereby an impact medium may be admitted through said sealing means of a volume adapted to not fill said cavity, and means whereby only a limited amount of a pressure fluid may be quickly admitted to said cavity to impart a velocity to said medium.

20. In an apparatus for testing hollow articles having a plurality of openings leading into the cavity of such articles, means for sealing said openings, means whereby an impact medium may be admitted through said sealing means of a volume adapted to not fill said cavity, air venting means for said cavity extending through said sealing means, and means whereby a fluid pressure may be momentarily admitted to said medium through said seal.

21. In an apparatus for testing hollow articles having a plurality of openings leading into the cavity of such articles, means whereby said openings may be readily sealed and unsealed, and means whereby an impact medium and a fluid pressure may be admitted to said cavity through said seals.

22. In an apparatus for testing hollow articles having a plurality of openings leading into the cavity of such articles, means whereby said openings may be readily sealed and unsealed, means whereby an impact medium and a fluid pressure may be admitted to said cavity through said seals and venting means for said cavity extending through said sealing means.

BYRON S. DAGUE.